(12) United States Patent
Sue

(10) Patent No.: US 6,835,685 B2
(45) Date of Patent: Dec. 28, 2004

(54) DIELECTRIC CERAMIC MATERIAL AND DIELECTRIC RESONATOR USING THE SAME

(75) Inventor: Toshiyuki Sue, Kokubu (JP)

(73) Assignee: Kyocera Corporation, Kyoto (JP)

( * ) Notice: Subject to any disclaimer, the term of this patent is extended or adjusted under 35 U.S.C. 154(b) by 245 days.

(21) Appl. No.: 10/005,179

(22) Filed: Dec. 4, 2001

(65) Prior Publication Data

US 2003/0104922 A1 Jun. 5, 2003

(51) Int. Cl.$^7$ ............................................. C04B 35/495
(52) U.S. Cl. ...................................................... 501/135
(58) Field of Search ......................................... 501/135

(56) References Cited

U.S. PATENT DOCUMENTS 5,268,341 A * 12/1993 Koyasu et al. .............. 501/135
5,432,135 A * 7/1995 Hirahara et al. ............ 501/135
6,051,515 A * 4/2000 Hiramatsu ................... 501/135

* cited by examiner

Primary Examiner—Karl Group
(74) Attorney, Agent, or Firm—Hogan&Hartson

(57) ABSTRACT

The dielectric ceramic material of the present invention is constituted from a solid solution of which dominant crystal phase is a perovskite crystal, and the perovskite crystal consists of complex oxide of at least Ba, Sr, Mg, W and rare earth element, and is preferably used for dielectric resonator since this dielectric ceramic material makes it possible to achieve a high values of ∈r and Q factor in a high frequency region, and decrease the absolute value of the temperature factor τf of resonant frequency.

15 Claims, 1 Drawing Sheet

DIELECTRIC CERAMIC MATERIAL AND DIELECTRIC RESONATOR USING THE SAME

FIELD OF THE INVENTION

The present invention relates to a novel dielectric ceramic material which shows a high relative dielectric constant and a high Q factor in high frequency regions such as microwaves and millimeter waves and, more particularly, to a dielectric ceramic material suitable for forming high frequency electronic components such as dielectric resonator, filter and capacitor, dielectric substrate for MIC and waveguide for millimeter-wave applications.

BACKGROUND OF THE INVENTION

Dielectric ceramic materials have been widely used in dielectric resonators and dielectric substrate for MIC which are used in high frequency applications such as microwave and millimeter waves. Recently dielectric strip line has found applications in millimeter band waveguides. The major requirements for the dielectric ceramic material are as follows.

(1) The material must have high relative dielectric constant when used to make a small-sized component, since the electromagnetic wave propagating in a dielectric material has a wavelength reduced to $(1/\in r)^{1/2}$.

(2) The material must have less dielectric loss, namely a high Q factor, at high frequencies.

(3) Resonant frequency of the material must be subject to less variation when the temperature changes, that is, the relative dielectric constant $\in r$ must be stable with less temperature dependency.

The present applicant previously proposed, as the materials that satisfy these requirements, a BaMgW-based dielectric ceramic composition consisting of BaO, MgO and $WO_3$ in a particular composition range (Japanese Unexamined Patent Publication No. 5-205524), a SrMgW-based dielectric ceramic composition consisting of SrO, MgO and $WO_3$ in a particular composition range (Japanese Unexamined Patent Publication No. 6-5117), and a (BaMgW +3a group element of periodic table)based dielectric ceramic composition consisting of BaO, MgO, $WO_3$ and an oxide of 3a group element in a particular composition range (Japanese Unexamined Patent Publication No. 6-236708).

There has been such a problem that, the BaMgW-based dielectric ceramic composition (Japanese Unexamined Patent Publication No. 5-205524), the SrMgW-based dielectric ceramic composition (Japanese Unexamined Patent Publication No. 6-5117), and the (BaMgW+3a group element)-based dielectric ceramic composition (Japanese Unexamined Patent Publication No. 6-236708) have Q factors ranging from 25000 to 180000, which are converted to values on the basis of 1 GHz, in a range of relative dielectric constant $\in r$ from 19 to 25. As the Q factor can become less than 100000, it has been required to improve the Q factor.

SUMMARY OF THE INVENTION

A main object of the present invention is to provide a dielectric ceramic material which has Q factor not less than 100000 in a range of relative dielectric constant $\in r$ from 19 to 25, particularly a dielectric ceramic material which has a high value of Q factor not less than 130000 in a range of relative dielectric constant $\in r$ from 19 to 25, and a dielectric resonator based on the same.

Another object of the present invention is to provide a dielectric ceramic material having relative dielectric constant $\in r$ which is less dependent on the temperature, namely that is stable with smaller absolute value of temperature factor $\tau f$ of resonant frequency, and a dielectric resonator based on the same.

The dielectric ceramic material of the present invention which achieves the objects described above is a solid solution of which dominant crystal phase is a perovskite crystal, and the perovskite crystal comprises a complex oxide of at least Ba, Sr, Mg, W and RE (RE represents rare earth element).

The dielectric ceramic material of the present invention preferably contains the perovskite crystal comprising a complex oxide of at least Ba, Sr, Mg, W and RE, in a proportion of at least 90% by volume.

The dielectric ceramic material of the present invention preferably contains at least Ba, Sr, Mg, W and a rare earth element as metal elements, and when oxides of the metal elements are represented by $aBaO \cdot bSrO \cdot cMgO \cdot dWO_3 \cdot eRE_2O_x$ ($3 \leq x \leq 4$, RE represents a rare earth element)) in a molar ratio of the metal oxides, the factors a, b, c, d and e satisfy the following relationships:

$0.35 \leq a \leq 0.55$, $0.01 \leq b \leq 0.25$, $0.10 \leq c \leq 0.30$, $0.15 \leq d \leq 0.35$, $0.01 \leq e \leq 0.20$, and $a+b+c+d+e=1$ RE of the dielectric ceramic material of the present invention is preferably Yb. It is also preferable that the dielectric ceramic material of the present invention contains Mn as the metal element in the amount of 0.01 to 2% by weight on $MnO_2$ basis.

The dielectric resonator of the present invention is made in such a constitution as the dielectric ceramic material described above is disposed between a pair of input and output terminals so as to function through electromagnetic coupling.

Other objects and advantages of the present invention will become apparent from the following detailed description.

DETAILED DESCRIPTION OF THE INVENTION

Figure 1:
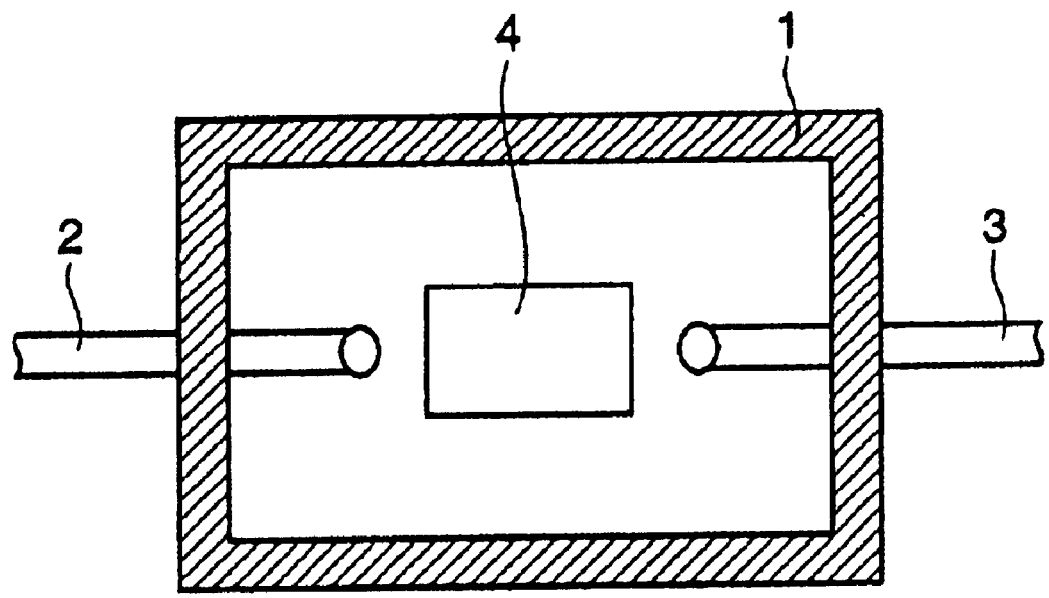
FIG. 1 is a sectional view showing an example of the dielectric resonator of the present invention.

The dielectric ceramic material of the present invention refers to a sintered material made by firing a preform of a ceramic material. In order to obtain a Q factor of a higher value, it is important that the material is a solid solution of which dominant crystal phase is a perovskite crystal, and the perovskite crystal comprises a complex oxide of at least Ba, Sr, Mg, W and RE (RE represents rare earth element).

The dielectric ceramic material of the present invention preferably contains at least 90% by volume of the perovskite crystal. Including at least 90% of the perovskite crystal enables it to improve the Q factor. In order to improve the Q factor further, it is preferable to contain 95% by volume or more of the perovskite crystal.

As crystal phase other than perovskite crystal, $RE_2O_x$ ($3 \leq x \leq 4$), MgO, $BaWO_4$, $BaW_2O_9$, $Ba_2WO_5$, $MgWO_4$ and the like may also exist.

The content of the perovskite crystal in the dielectric ceramic material of the present invention is determined by observation with a transmission type electron microscope, analysis of selected area electron diffraction image, measurement by energy-dispersive X-ray spectrometry (EDS), or microscopic X-ray diffraction method. When measuring the content of perovskite crystal included in the dielectric ceramic material of the present invention, it is preferable to employ the observation with a transmission type electron microscope, analysis of selected area electron diffraction image and measurement by energy-dispersive X-ray spectrometry (EDS).

Observation with a transmission type electron microscope, analysis of selected area electron diffraction image and measurement by EDS analysis are carried out in the following steps (A) to (C).

(A) Observe the inner crystal structure of the dielectric ceramic material by means of selected area diffraction image of an area about $5 \times 10^{-3}$ to $5 \times 10^{-2}$ mm$^2$, magnified about 2000 to 8000 times, so as to analyze the electron diffraction image of each crystal and identify the crystal structure.

(B) When crystal phase identified in the step (A) is a perovskite crystal and is a solid solution comprising a complex oxide of at least Ba, Sr, Mg, W and RE, the crystal is regarded as the perovskite crystal to be included in the dielectric ceramic material of the present invention. An example of the crystal phase of the perovskite crystal included in the dielectric ceramic material of the present invention is $Ba_2MgWO_6$. An example of the. $Ba_2MgWO_6$ may be $Ba_2MgWO_6$ of JCPDS Nos.70-2023 and 70-2404.

(C) Proportion of the area of the perovskite crystal identified in the step (B) to the total area of the crystal in the photograph of step (A) is determined to give the percentage by volume of the perovskite crystal.

For the measurement, a transmission type electron microscope JEM2010F manufactured by JEOL and an EDS analyzer Voyager IV manufactured by Noran Instruments may be used.

The dielectric ceramic material of the present invention preferably contains at least Ba, Sr, Mg, W and RE as the metal elements, and in case oxides of the metal elements are represented by $aBaO \cdot bSrO \cdot cMgO \cdot dWO_3 \cdot eRE_2O_x$ ($3 \leq x \leq 4$, RE represents a rare earth element)) in a molar ratio of the metal oxides, the factors a, b, c, d and e satisfy the relationships of $0.35 \leq a \leq 0.55$, $0.01 \leq b \leq 0.25$, $0.10 \leq c \leq 0.30$, $0.15 \leq d \leq 0.35$, $0.01 \leq e \leq 0.20$, and $a+b+c+d+e=1$.

The present invention sets the restrictions on the values of a, b, c, d, and described above for the following reasons.

The range of $0.35 \leq a \leq 0.55$ is chosen because this range gives high Q factors. A range of $0.40 \leq a \leq 0.50$ is more preferable. The range of $0.01 \leq b \leq 0.25$ is chosen because $\varepsilon r$ is less dependent on temperature in this range. A range of $0.01 \leq b \leq 0.15$ is more preferable. The range of $0.10 \leq c \leq 0.30$ is chosen because this range gives high Q factors. A range of $0.15 \leq c \leq 0.25$ is more preferable. The range of $0.15 \leq d \leq 0.35$ is chosen because this range gives high Q factors. A range of $0.20 \leq d \leq 0.30$ is more preferable. The range of $0.01 \leq e \leq 0.25$ is chosen because $\varepsilon r$ is less dependent on temperature in this range. A range of $0.01 \leq e \leq 0.10$ is more preferable.

In order to achieve Q factor having a high value of 100000 or over in a range of relative dielectric constant $\varepsilon r$ from 19 to 25 and less temperature-dependent characteristic of relative dielectric constant $\varepsilon r$, namely stable and small absolute value of temperature factor $\tau f$ of resonant frequency, the rare earth element (RE) contained in the dielectric ceramic material of the present invention is preferably at least one kind selected from among oxides of Y, La, Ce, Pr, Nd, Sm, Eu, Gd, Tb, Dy, Ho, Er and Yb. In order to obtain a dielectric ceramic material of relative dielectric constant $\varepsilon r$ and temperature factor $\tau f$ of resonant frequency which have stable values and are less affected by changes in the firing temperature, it is most preferable touse Yb.

It is important that the dielectric ceramic material of the present invention contains Mn as the metal element in the amount of 0.01 to 2% by weight on $MnO_2$ basis. This is because the Q factor decreases when the content of Mn is less than 0.01% by weight on $MnO_2$ basis, and content of 2% by weight or more makes it difficult to sinter.

The dielectric ceramic material of the present invention may be either polycrystal such as sintered material or a single crystal.

The dielectric ceramic material of the present invention can be manufactured as follows. Oxides of Ba, Sr, Mg, W and RE or metal salts such as carbonate, nitrate or acetate of Ba, Sr, Mg, W and RE which produce the oxides when fired are prepared as main stock materials Such quantities of these materials that fall within the ranges described above are weighed and well mixed. The mixture is subjected to calcining at a temperature of 1000 to 1300° C., and is ground into powder of an average particle size in a range from 0.7 to 1.2 μm. The resultant calcined powder is formed into a preform of a predetermined shape by a known forming method such as press forming or doctor blade method. After leaving the preform in an oxidizing atmosphere such as air at a temperature of 1670 to 1700° C. for 2 to 10 hours, the temperature is lowered to a level about 1200 to 800° C. at a rate in a range from 5 to 100° C. per hour, thereby obtaining the dielectric ceramic material of the present invention.

The reason for the dielectric ceramic material of the present invention having high Q factor can be obtained may be because Ba, Sr, Mg, W and RE are sufficiently incorporated as a solute in the perovskite crystal and lattice defects such as oxygen defects can be decreased by restricting the process of maintaining at the high temperature and then lowering the temperature as described above. That is, it is assumed, formation of the solid solution can be accelerated by firing at a high temperature of 1670 to 1700° C. for 2 to 10 hours, and lattice defects can be decreased by lowering the temperature to a level about 1200 to 800° C. at a rate in a range from 5 to 100° C. per hour. With a manufacturing process other than that described above, the solid solution may not be fully formed and lattice defects may increase, thus resulting in a lower Q factor.

Further decrease in the lattice defects and higher Q factor may be achieved by containing 0.01 to 2% by weight of Mn on $MnO_2$ basis.

The dielectric ceramic material of the present invention may include inevitable impurities such as Cl, Al, P, Na, Ca and Zr. Inclusion of any of these impurities by about 0.1% by weight or less does not cause any problem in the characteristics.

The dielectric ceramic material of the present invention can be used most preferably for a dielectric resonator. FIG. 1 schematically shows a dielectric resonator operating in TE mode. The dielectric resonator shown in FIG. 1 comprises an input terminal 2 and an output terminal 3 disposed on opposing inner walls of a metal case 1, and the dielectric ceramic material 4 of the present invention disposed between the input terminal 2 and the output terminals 3. In the dielectric resonator operating in TE mode, when microwave is input through the input terminal 2, the microwave is confined in the dielectric resonator 4 by reflections at the interfaces between the dielectric resonator 4 and the free space, thus oscillating at a particular frequency. The oscillation is electromagnetically coupled with the output terminal 3 and provided as an output signal.

The dielectric ceramic material of the present invention may also be applied to other resonators such as coaxial resonator or strip-line resonator which uses TEM mode and dielectric resonator operating in TM mode, as a matter of course. A dielectric resonator can be made also by attaching the input terminal 2 and the output terminals 3 directly to the dielectric ceramic material 4.

The dielectric ceramic material 4, which is a resonating medium made of the dielectric ceramic material of the present invention in a predetermined shape, may be formed in any shape such as rectangular parallelepiped, cube, sheet, disk, cylinder or polygonal prism, as long as it allows resonance. The input high frequency signal has a frequency of about 1 to 500 GHz, and resonance frequency is preferably in a range from about 2 GHz to 80 GHz from the view point of practical operation.

Thus according to the present invention, the dielectric ceramic material having high Q factor and relative dielectric constant $\in r$ which has a large value and is stable and less dependent on the temperature is obtained. The dielectric ceramic material can be applied preferably to resonators used in microwave and millimeter wave regions, dielectric substrate for MIC, capacitor, dielectric antenna, and dielectric waveguide.

EXAMPLES

Powders of $BaCO_3$, $SrCO_3$, $MgCO_3$, $WO_3$, oxide of a rare earth element and MnO2, all having purity of 99% or higher, were weighed and mixed with water in proportions shown in Table 1 in wet process for 8 hours in a ball mill lined with rubber on the inner surface thereof. The mixture was, after dewatering and drying, subjected to calcining at 1000° C. for two hours. The calcined product was subjected to wet grinding process with ball mill into powder of an average particle size in a range from 0.8 to 1.0 $\mu$m.

The ground powder was dried and granulated and was formed into a preform of cylindrical shape measuring 10 mm in diameter and 5 mm thick. The cylindrical preform was held at a temperature of 1670 to 1700° C. for 2 to 10 hours, and then the temperature was lowered to a level about 1200 to 800° C. at a rate in a range from 5 to 100° C. per hour, thereby making the dielectric ceramic material of the present invention Relative dielectric constant ($\in r$) at frequency 10 GHz and Q factor of the ceramic material obtained as described above were measured by the dielectric resonator method. The values of temperature factor ($\tau f$) of resonant frequency at temperatures from 25 to 85° C. were also calculated by equation $\tau f = [(f_{85} - f_{25})/f_{25}]/60 \times 10^6$ (ppm/° C.). Here "$f_{85}$" represents the resonant frequency at 85° C., and "$f_{25}$" represents the resonant frequency at 25° C. These values are shown in Table 1.

Volumetric percentage of the crystal consisting of a perovskite crystal was determined by the observation with a transmission type electron microscope, analysis of selected area electron diffraction image and EDS analysis. The measurements were carried out in steps (A) to (C) described previously.

For the measurement, the transmission type electron microscope JEM2010F manufactured by JEOL and the EDS analyzer Voyager IV manufactured by Noran Instruments were used.

The measurements showed that the perovskite crystal included in all of the samples Nos.1 to 25 prepared according to the present invention were constituted from solid solution of complex oxide of Ba, Sr, Mg, W and RE. In case the samples of the present invention included crystal phase other than perovskite crystal, the crystal phase other than the perovskite crystal was $Yb_2O_3$, MgO or the like.

The notation in Table 1, for example, "0.1La. 0.9Ho" indicates that La and Ho are included in proportions of 0.1: 0.9.

TABLE 1

| Sample No. | Rare earth element ratio | BaO a | SrO b | MgO c | WO₃ d | RE₂O₃ e | Total | MnO₂ (% by weight) | Duration of firing at 1670 to 1700° C. (hours) | Cooling rate from 1200 to 800° C. (° C./hours) | Content of perovskite crystal (volume %) | ∈ r | Q factor | τ f (ppm/° C.) |
|---|---|---|---|---|---|---|---|---|---|---|---|---|---|---|
| 1 | Yb | 0.354 | 0.161 | 0.210 | 0.250 | 0.025 | 1.000 | 0.01 | 2 | 5 | 97.5 | 23.5 | 123000 | 22.3 |
| 2 | Yb | 0.463 | 0.052 | 0.210 | 0.250 | 0.025 | 1.000 | 0.01 | 2 | 10 | 98.6 | 21.5 | 206000 | 1.1 |
| 3 | Yb | 0.546 | 0.015 | 0.164 | 0.250 | 0.025 | 1.000 | 0.00 | 2 | 20 | 97.7 | 20.2 | 160000 | -8.6 |
| 4 | Yb | 0.450 | 0.050 | 0.210 | 0.265 | 0.025 | 1.000 | 0.05 | 3 | 30 | 100.0 | 20.5 | 231000 | -6.2 |
| 5 | Yb | 0.400 | 0.100 | 0.210 | 0.265 | 0.025 | 1.000 | 0.02 | 4 | 40 | 97.4 | 21.8 | 154000 | 10.6 |
| 6 | Yb | 0.265 | 0.250 | 0.210 | 0.250 | 0.025 | 1.000 | 0.05 | 5 | 50 | 91.5 | 24.2 | 132000 | 31.3 |
| 7 | Yb | 0.460 | 0.040 | 0.110 | 0.350 | 0.040 | 1.000 | 0.10 | 2 | 20 | 97.9 | 21.6 | 180000 | 2.4 |
| 8 | Yb | 0.460 | 0.040 | 0.200 | 0.250 | 0.050 | 1.000 | 0.10 | 3 | 25 | 97.4 | 21.3 | 195000 | 0.3 |
| 9 | Yb | 0.460 | 0.040 | 0.300 | 0.150 | 0.050 | 1.000 | 0.20 | 8 | 80 | 96.3 | 20.8 | 176000 | 3.5 |
| 10 | Yb | 0.460 | 0.040 | 0.210 | 0.160 | 0.130 | 1.000 | 0.20 | 9 | 90 | 99.0 | 22.5 | 148000 | 20.1 |
| 11 | Yb | 0.460 | 0.040 | 0.210 | 0.200 | 0.090 | 1.000 | 0.05 | 10 | 100 | 99.0 | 23.6 | 149000 | 14.6 |
| 12 | Yb | 0.460 | 0.040 | 0.110 | 0.350 | 0.040 | 1.000 | 0.02 | 10 | 100 | 99.0 | 21.6 | 162000 | -1.6 |
| 13 | Yb | 0.430 | 0.065 | 0.200 | 0.245 | 0.060 | 1.000 | 0.00 | 4 | 40 | 98.0 | 22.6 | 154000 | 7.2 |
| 14 | Yb | 0.450 | 0.040 | 0.205 | 0.225 | 0.080 | 1.000 | 0.20 | 6 | 60 | 97.5 | 21.8 | 172000 | 8.6 |
| 15 | Yb | 0.470 | 0.020 | 0.210 | 0.180 | 0.120 | 1.000 | 0.20 | 6 | 60 | 96.8 | 22.7 | 143000 | 18.6 |
| 16 | Y | 0.440 | 0.050 | 0.165 | 0.280 | 0.065 | 1.000 | 0.10 | 4 | 25 | 99.5 | 20.6 | 165000 | -4.2 |
| 17 | Y | 0.460 | 0.030 | 0.220 | 0.210 | 0.080 | 1.000 | 0.10 | 5 | 70 | 98.0 | 21.6 | 185000 | 6.7 |
| 18 | Y | 0.480 | 0.020 | 0.260 | 0.150 | 0.090 | 1.000 | 0.10 | 5 | 80 | 97.0 | 22.2 | 168000 | 9.5 |

TABLE 1-continued

| Sample No. | Rare earth element ratio | BaO a | SrO b | MgO c | WO₃ d | RE₂O₃ e | Total | MnO₂ (% by weight) | Duration of firing at 1670 to 1700° C. (hours) | Cooling rate from 1200 to 800° C. (° C./hours) | Content of perovskite crystal (volume %) | ∈r | Q factor | τf (ppm/° C.) |
|---|---|---|---|---|---|---|---|---|---|---|---|---|---|---|
| 19 | 0.1La—0.9Ho | 0.460 | 0.030 | 0.210 | 0.200 | 0.100 | 1.000 | 0.10 | 2 | 20 | 96.5 | 22.6 | 152000 | 12.3 |
| 20 | 0.9Lu—0.1Gd | 0.410 | 0.030 | 0.210 | 0.190 | 0.160 | 1.000 | 0.10 | 2 | 30 | 90.0 | 24.7 | 132000 | 28.6 |
| 21 | 0.1Y—0.9Yb | 0.480 | 0.030 | 0.200 | 0.250 | 0.040 | 1.000 | 0.10 | 2 | 40 | 98.0 | 20.9 | 189000 | −11.2 |
| 22 | 0.1Er—0.9Eu | 0.430 | 0.030 | 0.220 | 0.200 | 0.120 | 1.000 | 0.10 | 2 | 15 | 97.8 | 22.4 | 168000 | 12.3 |
| 23 | 0.5Nd—0.5Sm | 0.480 | 0.030 | 0.220 | 0.230 | 0.040 | 1.000 | 0.10 | 2 | 20 | 97.6 | 21.1 | 196000 | −5.7 |
| 24 | Dy | 0.460 | 0.050 | 0.220 | 0.210 | 0.060 | 1.000 | 0.20 | 4 | 25 | 97.0 | 21.6 | 189000 | 1.2 |
| 25 | Tb | 0.460 | 0.030 | 0.230 | 0.220 | 0.060 | 1.000 | 0.20 | 4 | 8 | 98.0 | 21.8 | 197000 | 2.2 |
| 26 | Yb | 0.440 | 0.060 | 0.240 | 0.230 | 0.030 | 1.000 | 0.20 | 15 | 50 | 94.0 | 22.6 | 101000 | 10.6 |
| 27 | Yb | 0.570 | 0.030 | 0.150 | 0.170 | 0.080 | 1.000 | 0.10 | 6 | 30 | 94.0 | 25.3 | 103000 | 6.3 |
| 28 | Yb | 0.360 | 0.260 | 0.170 | 0.160 | 0.050 | 1.000 | 0.05 | 5 | 30 | 93.0 | 22.6 | 104000 | 41.3 |
| 29 | Yb | 0.380 | 0.080 | 0.320 | 0.170 | 0.050 | 1.000 | 0.10 | 5 | 35 | 93.0 | 26.3 | 101000 | 35.9 |
| 30 | Yb | 0.400 | 0.060 | 0.130 | 0.370 | 0.040 | 1.000 | 0.05 | 5 | 50 | 92.5 | 20.1 | 106000 | 5.2 |
| 31 | Er | 0.460 | 0.030 | 0.270 | 0.120 | 0.120 | 1.000 | 0.10 | 4 | 15 | 93.0 | 23.5 | 110000 | 15.6 |
| 32 | Yb | 0.460 | 0.040 | 0.300 | 0.150 | 0.050 | 1.000 | 0.10 | 5 | 120 | 92.0 | 19.6 | 111000 | 2.2 |
| *33 | Yb | 0.000 | 0.230 | 0.280 | 0.310 | 0.180 | 1.000 | 0.00 | 3 | 50 | — | 22.8 | 12000 | 15.9 |
| *34 | Yb | 0.210 | 0.000 | 0.270 | 0.330 | 0.190 | 1.000 | 0.00 | 5 | 50 | — | 22.6 | 24000 | 18.7 |
| *35 | Y | 0.350 | 0.220 | 0.000 | 0.310 | 0.120 | 1.000 | 0.00 | 8 | 50 | — | 26.4 | 13000 | 48.0 |
| *36 | Yb | 0.300 | 0.210 | 0.230 | 0.000 | 0.260 | 1.000 | 0.00 | 3 | 50 | — | 31.7 | 15000 | 36.3 |
| *37 | — | 0.450 | 0.050 | 0.260 | 0.240 | 0.000 | 1.000 | 0.10 | 5 | 50 | — | 20.3 | 88500 | −18.6 |

Sample numbers marked with * are not within the scope of the present invention.

As can be seen in Table 1, the samples Nos.1 to 32 which are within the scope of the present invention showed excellent characteristics of ∈r in a range from 20 to 25, Q factor not less than 100000 and absolute value of τf being 35 or less. The samples Nos.1 to 25, in particular, which were made by setting the molar ratio a, b, c, d and e in particular range, showed high values of Q factor as high as 120000 or more.

In case the rare earth element included in the sample which is within the scope of the present invention is Yb, a dielectric ceramic material which has relative dielectric constant ∈r and temperature factor τf of resonant frequency of stable values that are less affected by changes in the firing temperature was obtained.

Samples Nos.33 to 37, which were out of the scope of the present invention, showed either a low value of ∈r, a low value of Q factor or an absolute value of τf higher than 35, The present invention is not limited to Examples described above, and various modifications can be made without departing from the spirit and scope of the invention.

What is claimed is:

1. A dielectric ceramic material comprising a solid solution of which dominant crystal phase comprises a perovskite crystal, and the perovskite crystal comprises a complex oxide of at least Ba, Sr, Mg, W and a rare earth element.

2. The dielectric ceramic material according to claim 1, wherein a perovskite crystal is contained in the amount of at least 90% by volume.

3. The dielectric ceramic material according to claim 1, wherein at least Ba, Sr, Mg, W and a rare earth element are contained as metal elements, and when oxides of these metal elements are represented by $aBaO \cdot bSrO \cdot cMgO \cdot dWO_3 \cdot eRE_2O_x$ ($3 \leq x \leq 4$, RE represents a rare earth element)) in a molar ratio of the metal oxides, the factors a, b, c, d and e satisfy the following relationships:

$0.35 \leq a \leq 0.55$, $0.01 \leq b \leq 0.25$, $0.10 \leq c \leq 0.30$, $0.15 \leq d \leq 0.35$, $0.01 \leq e \leq 0.20$, and $a+b+c+d+e=1$.

4. The dielectric ceramic material according to claim 1, wherein the rare earth element (RE) is Yb.

5. The dielectric ceramic material according to claim 1, wherein Mn is contained as the metal element in the amount of 0.01 to 2% by weight on MnO₂ basis.

6. A dielectric resonator comprising the dielectric ceramic material of any one of claims 1 to 5 disposed between a pair of input and output terminals, so as to function through electromagnetic coupling.

7. The dielectric ceramic material according to claim 1, wherein at least Ba, Sr, Mg, W and a rare earth element are contained as metal elements, and when oxides of these metal elements are represented by $aBaO \cdot bSrO \cdot cMgO \cdot dWO_3 \cdot eRE_2O_x$ ($3 \leq x \leq 4$, RE represents a rare earth element)) in a molar ratio of the metal oxides, the factors a, b, c, d and e satisfy the following relationships:

$0.40 \leq a \leq 0.50$, $0.01 \leq b \leq 0.15$, $0.15 \leq c \leq 0.25$, $0.20 \leq d \leq 0.30$, $0.01 \leq e \leq 0.10$, and $a+b+c+d+e=1$.

8. The dielectric ceramic material according to claim 3, wherein, the factor a satisfies the following relationship: $0.40 \leq a \, 0.50$.

9. The dielectric ceramic material according to claim 3, wherein, the factor b satisfies the following relationship: $0.01 \leq b \leq 0.15$.

10. The dielectric ceramic material according to claim 3, wherein, the factor c satisfies the following relationship: $0.15 \leq c \leq 0.25$.

11. The dielectric ceramic material according to claim 3, wherein, the factor d satisfies the following relationship: $0.20 \leq d \leq 0.30$.

12. The dielectric ceramic material according to claim 3, wherein, the factor e satisfies the following relationship: $0.01 \leq e \leq 0.10$.

13. The dielectric ceramic material according to claim 1, wherein the rare earth element (RE) is selected from the group consisting of Y, La, Ce, Pr, Nd, Sm, Eu, Gd, Tb, Dy, Ho, Er, and Yb.

14. The dielectric ceramic material according to claim 1, wherein the dielectric ceramic material is polycrystal or a single crystal.

15. The dielectric ceramic material according to claim 1, wherein a perovskite crystal is contained in the amount of at least 95% by volume.

* * * * *